(12) United States Patent  (10) Patent No.: US 6,312,135 B1
Polzer  (45) Date of Patent: Nov. 6, 2001

(54) ELECTRIC EXTERNAL REAR VIEW MIRROR

(75) Inventor: Herwig Polzer, Miltenberg (DE)

(73) Assignee: Donnelly Hohe GmbH & Co. KG (DE)

(*) Notice: Subject to any disclaimer, the term of this patent is extended or adjusted under 35 U.S.C. 154(b) by 0 days.

(21) Appl. No.: 09/394,970

(22) Filed: Sep. 10, 1999

(30) Foreign Application Priority Data

Sep. 11, 1998 (DE) .............................. 198 41 551

(51) Int. Cl.⁷ ..................................... G02B 7/182
(52) U.S. Cl. ................ 359/872; 359/871; 359/865; 264/239; 264/272.11
(58) Field of Search .................... 359/871, 872, 359/865; 264/239, 272.11, 272.14, 272.16, 272.17, 272.2

(56) References Cited

U.S. PATENT DOCUMENTS

| 4,733,061 | * | 3/1988 | Hegi | 235/492 |
| 4,890,908 | * | 1/1990 | Casey | 359/871 |
| 4,941,258 | * | 7/1990 | Wright | 29/858 |
| 5,105,342 | * | 4/1992 | Zillgitt et al. | 362/66 |
| 5,455,716 | * | 10/1995 | Suman et al. | 359/838 |
| 5,896,238 | * | 4/1999 | Hubscher et al. | 359/877 |

FOREIGN PATENT DOCUMENTS

| 31 06 792 A | 9/1982 | (DE) . |
| 44 22 572 A | 1/1996 | (DE) . |
| 195 20 320 C1 | 5/1996 | (DE) . |
| 196 01 565 C2 | 6/1997 | (DE) . |
| 296 20 775 U | 3/1998 | (DE) . |
| 298 10 522 U | 10/1998 | (DE) . |
| 197 24 725 C1 | 2/1999 | (DE) . |
| 0 476 600 A | 3/1992 | (EP) . |
| 58-156432 | 9/1983 | (JP) . |
| WO 90 10555 A | 9/1990 | (WO) . |

* cited by examiner

Primary Examiner—Mohammad Sikder
(74) Attorney, Agent, or Firm—McGlew and Tutle, P.C.

(57) ABSTRACT

The invention relates to an external rear view mirror of a motor vehicle with a glass subassembly, at least one electrical function element, more particularly an adjustment drive and/or a lighting device and/or a folding drive and/or a heating element, and a support element, to which the electrical function element can be secured. In order to increase the electrical operational reliability of the external rear view mirror and to facilitate the assembly of the cabling, the support element (1) includes at least one electrical conductor path (6), to whose first end (7, 13, 14, 15, 17) an electrical function element (3, 4, 5) can be connected and to whose second end (19) a power supply of the motor vehicle can be connected.

24 Claims, 3 Drawing Sheets

ELECTRIC EXTERNAL REAR VIEW MIRROR

FIELD OF THE INVENTION

The invention relates to an external rear view mirror for a motor vehicle, which is arranged, for example, in the region of a side window, a side door or a fender of a motor vehicle and has a glass subassembly, an adjustment drive and/or an electro-optic element and/or a lighting device and/or a folding drive and/or a heating element, and a support element, to which the electrical function element can be secured.

BACKGROUND OF THE INVENTION

External rear view mirrors of this type are used in a wide variety of designs in motor vehicle construction. In addition to the glass subassembly, in the mirror surface of which the driver can observe the traffic behind, these external rear view mirrors comprise at least one electrical function element. Electrical function elements are all subassemblies which need to be supplied with electrical voltage from the vehicle power supply, such as the vehicle battery or vehicle ignition system which is typically at a nominal of 12 Volts or in the future 42 Volts, in order to function correctly. Also electro-optic reflective elements such as an electro-chromatic reflective element in the external rear view mirror are typically electrically connected to the vehicle interior mirror (or to another vehicular component) requiring further wiring connection to the vehicle cabin. Particularly frequently, but by no means exclusively, electrical adjustment drives for adjusting the glass subassembly and/or lighting devices and/or folding drives and/or heating elements are fitted in external rear view mirrors of this type. Further electrical function elements which can be built into the external rear view mirror are signal devices, such as indicators, brake lights, side lights and parking lights. Also included under the heading of electrical function elements in the sense of the invention are sensors which are fitted into the external rear view mirrors, such as thermal sensors, proximity sensors, toll-booth transducers, blind-spot detectors, car phone antennae, radar sensors, radio receivers and/or GPS antennae systems.

For the mechanical securing of the individual electrical function elements in the external rear view mirror, the latter comprises at least one support element. The support element is in turn directly or indirectly connected to a mirror base secured to the vehicle body, for example via a swivel or tilting joint, which may comprise a powerfold joint as is known in the art.

In order to supply the electrical function elements in the external rear view mirror, sets of cables are guided into the mirror interior, so that the function elements can be connected via plug connections to the electrical vehicle power supply of the motor vehicle.

A disadvantage of the known cabling of external rear view mirrors is that the required cable sets need to be predominantly laid by hand with a high assembly outlay. In addition, the cable sets and plug connections need to be protected, at high cost, against malfunctioning caused by wear, for example as a result of vibrations and friction, or by the penetration of moisture and leakage water.

SUMMARY AND OBJECTS OF THE INVENTION

It is the object of the invention to provide an external rear view mirror of the generic type, which can be assembled rapidly, easily and cost effectively and offers a high degree of operational reliability.

According to the invention, a motor vehicle external rear view mirror is provided with a glass subassembly and at least one electrical functional element. The functional element may be an adjustment drive and/or an electro-optic element and/or a lighting device and/or a folding drive and/or a heating element. The rear view mirror has a support element, to which the electrical function element can be secured. The support element comprises at least one electrical conductor path, to whose first end an electrical function element can be connected and to whose second end the vehicle ignition system of the motor vehicle or a vehicle electronic-bus system or another vehicle component such as an interior rear view mirror, a door module, a seat module, a cell-phone system, a GPS-System or the like can be connected. Thus the at least one electrical conductor path connects an electrical function element in the external rear view mirror to a signal source and/or vehicle ignition voltage source in the cabin of the vehicle or elsewhere in the vehicle. Preferably should the external rear view mirror be detached from the vehicle such as can occur in accidental impacts during use on the road the electrical connection from the external rear view mirror to electrical functions elsewhere in the vehicle is broken without damage to either the electrical conductor path in the external rear view mirror or to the electrical conductor path of the vehicle. In cases where the entire electrical supply is effected via the conductor paths according to the invention, at least two conductor paths are provided. By fitting conductors paths of this type on the support element, a pre-cabling of the external rear view mirror is attained. During assembly of the external rear view mirror, the connection of the various function elements to the mains (system) power supply is thereby facilitated, since the connection points are arranged at defined points on the support element. In addition, the conductor paths are reliably protected against vibrations by the securing to the support element.

According to a preferred embodiment of the invention, the first end and/or the second end of the conductor path is constructed as a plug contact, more particularly as a plug tongue. In this manner, the contact elements on the function element and on the mains (system) power supply having a complementary function can be easily fitted onto the corresponding plug contacts on the support element, so that an electrically conductive contact can be produced in a simple assembly procedure. Thus for example the external rear view mirror housing can have electrical conductor paths molded therein and fixed rigidly in place and terminating in an electrical socket within the housing. Then, a mirror accessory such as an electrical actuator for adjusting the reflective elements can be attached, preferably by snap attachments into the external rear view mirror housing with a plug on the actuator interconnecting and mating with that preestablished socket in the housing. This facilitates a "plug and play" type addition of accessories to the external rear view mirror.

The function of the electrical function elements is particularly endangered by moisture and leakage water. For example, a film of moisture can form on cables, which can run along the cable sleeve into plug connections and thereby trigger malfunctions. In order to increase the operational reliability of external rear view mirrors of the generic type, it is therefore advantageous if the conductor paths are embedded at least in certain areas in the material of the support element. An additional casing of the conductor paths can be dispensed with in this case, since a reliable insulation of the conductor paths is ensured by the material of the support element, for example a substantially non conducting thermoplastic material. Moisture and leakage water cannot penetrate regions which are embedded in this manner.

The manufacture of a support element with the embedded conductor paths can be effected in a particularly simple and cost-effective manner by injection molding. In this respect, the conductor paths are laid in the mold pocket in a manner known per se prior to the injection of the plastics material and are then injection molded with the plastics material i.e. by integral molding as is known in the art. Only the ends of the conductor path are left uncovered, so that an electrically conductive connection is possible.

The material, which is used to manufacture the conductor paths, is essentially open to choice. Preferably, the conductor paths are manufactured from a wire material which is substantially resistant to bending, for example a brass wire, so that the conductor paths merely need to be held at their ends as they are laid into the mold pocket prior to injection molding with plastics material.

The conductor paths firstly serve the electrical connection of the function elements in the external rear view mirror with the vehicle ignition power supply and/or with another electrical function in the vehicle cabin and/or with a single signal source from a function within the vehicle cabin or elsewhere in the vehicle. According to a preferred embodiment of the invention, the conductor path has a profiled or hollow conductor cross section. As a result of the profiled shape of the conductor path, for example in the manner of an angle wire, U-profile wire or hollow profile wire, a stiffening effect is attained by the conductor path, so that it is possible to design the support element to be weaker, whilst retaining the same degree of mechanical strength, so that a reduction in weight and material is possible.

As an alternative to the use of materials which are resistant to bending, the conductor path can also be manufactured from a substantially flexible cable material. When cables or cable sets of this type are injection molded in place, it is necessary to fix the ends of the cables and possibly also regions between the ends in the correct position in the mold.

According to the invention, the manner in which the electrical contact is produced between the function element on the one hand and the mains (system) power supply on the other hand and the conductor paths of the support element, is open to choice. For example, plug contacts with short connecting cables can be provided on the function elements, which following the securing of the function element to the support element can be connected to the corresponding end of the conductor path. In order to reduce the assembly outlay during the cabling of the various function elements, it is advantageous if the electrical function element comprises at least one contact element having a complementary function to the first end of the conductor path, the contact element being arranged on the function element in such a manner that, when the electrical function element is secured in the correct position to the support element, the contact element can be brought into electrically conductive contact with the conductor path. In other words, this means that there is no need for a separate cabling of the function elements. The electrical contact is produced simultaneously with the mechanical securing of the function element to the support element. More particularly, this can be effected during the joining movement when securing the function element, in that a corresponding plug contact of the function element is pushed onto an end of the conductor path constructed as a plug tongue. It is also conceivable to use electrically conductive securing means, for example metal screws, in order to produce the electrical contact between the function element and conductor path.

As a result of the use of the support element according to the invention, it is possible to extensively preassemble the electrical cabling of the various function elements in the external rear view mirror. It is therefore advantageous if the two ends of a plurality of conductor paths, which each need to be connected to the mains (system) power supply of the motor vehicle, are arranged on the support element in such a manner that the contact elements of a multi-polar plug connector can be brought into contact in each case with the second end of a conductor path. In other words, this means that only a multi-polar plug connector needs to be connected to the support element following assembly of the external rear view mirror in order to produce the electrical connection of the external rear view mirror to the mains (system) power supply.

In cases where the fitting of a contact element directly on the support element is not possible, for example for reasons relating to space, a flexible current cable can be connected to the conductor path, the contact point between the conductor path and the current cable being embedded in the material of the support element. As a result of the embedding of the contact point in the material of the support element, said contact point is reliably protected against wear and moisture.

In the event of flexible current cables being fitted to the ends of the conductor paths for the connection of said conductor paths, it is advantageous if a plurality of said current cables form a cable set, at whose end a multi-polar plug connector is arranged for connecting the current cables to the mains (system) power supply. Consequently, it is possible to connect the entire external rear view mirror to the mains (system) power supply by connecting a single plug connector.

According to a preferred embodiment of the invention, the plug connection between the mains (system) power supply and the external rear view mirror is arranged in a recess in the mirror base, more particularly in the connecting element of the mirror base.

The assembly outlay during the cabling of the electrical function elements in the external rear view mirror can be reduced to a minimum if the plug connection between the mains (system) power supply and the external rear view mirror is constructed in such a manner that the contact elements of complementary function of the mains (system) power supply and external rear view mirror can be brought into electrically conductive contact with one another when the external rear view mirror is secured in the correct position to the mirror base. In other words, this means that the electrical contact between the conductor paths of the external rear view mirror and the mains (system) power supply is produced by a corresponding joining movement and/or corresponding securing means.

In one embodiment of the invention, a conductor path connects a connecting line of the mains (system) power supply with a connecting pole of a function element in each case. The number of required conductor paths can be reduced according to the invention in that at least one conductor path has a branched construction, so that at least two function elements can be connected together via said conductor path to the mains (system) power supply of the motor vehicle. Since it is generally customary in motor vehicle construction to connect all electrical consumers to a common ground (earth), it is possible to produce the ground connection of all electrical function elements in the external rear view mirror via a single branched conductor path. A branched conductor path can either comprise a plurality of ends, to which a function element can be connected in each case, or contact points are provided between the ends of the conductor path, to which a function element can also be connected in each case.

In cases where the electrical consumers of the vehicle supply signals to the two external rear view mirrors by means of a multiplex signal control using intelligent electronics, for example where a CAN-BUS system (Controlled Area Network) is used, a total of two or three conductor paths is sufficient in the external rear view mirror according to the invention, said conductor paths having a branched construction, so that one pole of a function element is electrically conductively connected to a conductor path in each case. In this case, the control of the function elements is effected via control signals, which are modulated to the supply voltage and are processed by corresponding receiving units in the function elements.

The design of the support element and whether it possibly undertakes additional functions of the external rear view mirror, is of no importance according to the invention and depends upon the design of the respective external rear view mirror. It is particularly advantageous if the support element is constructed in the manner of a central function support known per se, which can be secured to the mirror base. In a large number of mirror designs, central function supports of this type form one of the main components of the external rear view mirror. The glass subassembly can be adjustably hinge-mounted on the central function support. In order to cover the function elements of the external rear view mirror on the outside, an integral or multi-part mirror housing can be fitted onto the central function support. One end of the central function support is connected to the mirror base, which is secured to the motor vehicle body, the central function support being mounted so as to be, for the most part, foldable.

In principle, it is equally possible to construct the support element as part of the mirror housing, for example as the upper section, or as a body mirror.

The external rear view mirror will be explained in further detail in the following with the aid of drawings illustrating solely preferred embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
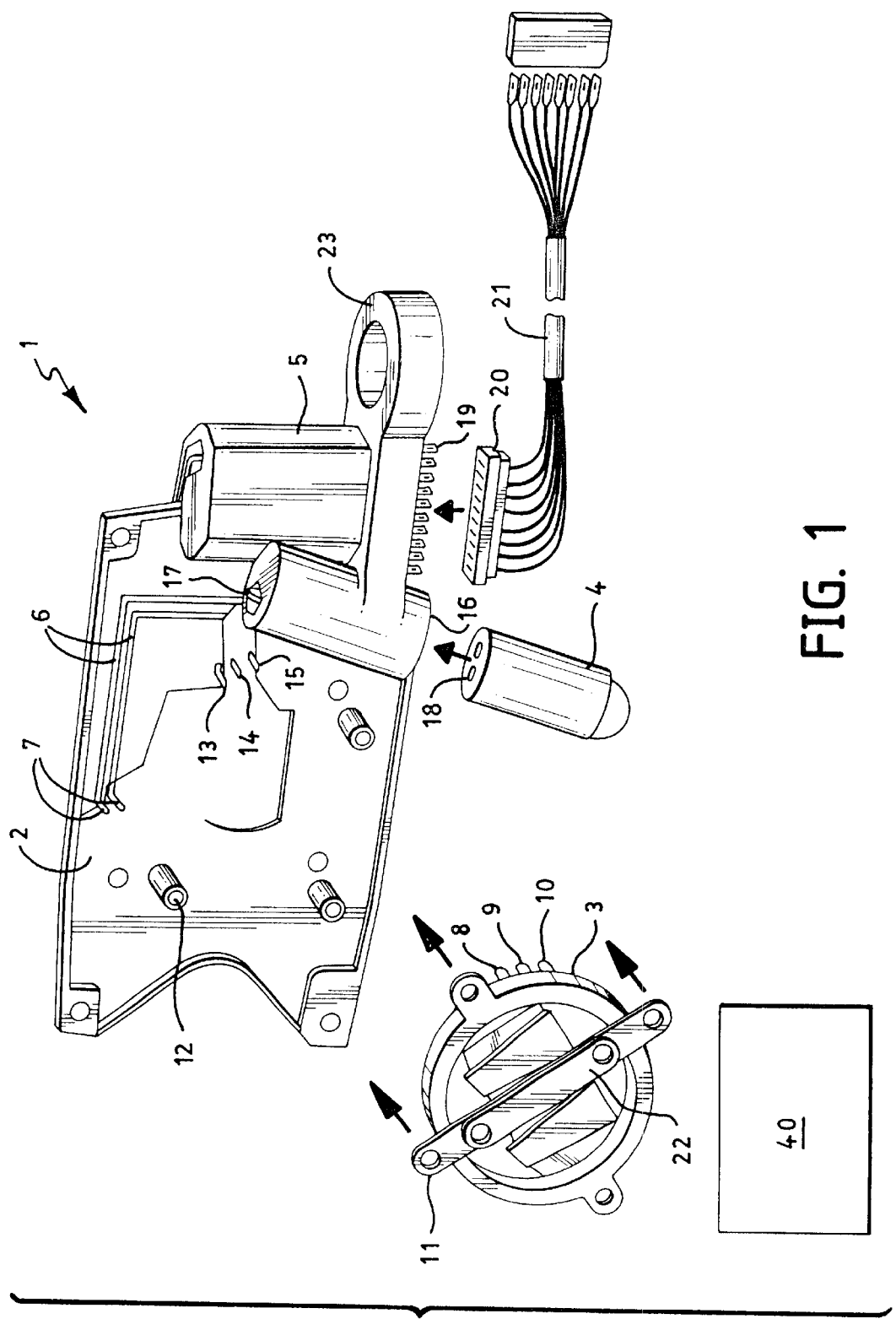
FIG. 1 is a perspective exploded view of a support element with various electrical function elements.

Referring to the drawings in particular, FIG. 1 shows a support element 1 constructed as a central function support 2, to which an electrical adjustment drive 3, an entry light 4 and a folding drive 5, shown covered, can be fitted. In order to supply the various electrical function elements 3, 4 and 5 with voltage from the mains power supply (i.e., system power), a plurality of conductor paths 6 are provided on the support plate 2, whose ends 7 are constructed as plug tongues.

In order to manufacture the central function support 2, the various conductor paths 6 are laid in a mold pocket and injection molded with plastics material. To allow better recognition of the course of the conductor paths 6, the upper right-hand corner of the central function support 2 is broken away in the drawing. The conductor paths 6 are manufactured from a wire material which is resistant to bending and are held at their ends 7 in the mold during the injection molding with plastics material.

The contact elements 8, 9 and 10 on the adjustment drive 3 are arranged in such a manner that they come into electrically conductive contact with the conductor paths 13, 14 and 15 during the assembly of the adjustment drive 3 with the securing of the retaining brackets 11 to the corresponding projections 12 of the central function support 2. This means that a cabling of the adjustment drive 3 is no longer necessary, since a corresponding plug connection is formed between the individual contact elements 8, 9 and 10 and 13, 14 and 15 with the joining movement during the screw-connection of the adjustment drive 3.

The same also applies to the entry light 4, which is fitted into the socket 16, the electrical contact being produced by fitting the plug tongues 17 onto the corresponding plug contacts 18.

The second ends 19 of the various conductor paths 6 are arranged parallel and adjacent one another on the underside of the central function support 2, so that the multi-polar plug connector 20, which can be connected to the mains power supply of the motor vehicle via the cable loom 21, can be easily attached in a linear joining movement.

A glass subassembly 40 is secured to the adjustment member 22 of the adjustment drive 3, so that the angle of reflection of the glass subassembly 40 can be adjusted by remote control according to the driver's requirements. By means of the securing flange 23, the central function support 2 is rotatably secured to a mirror base, not shown, which can be connected to the body of the motor vehicle. A mirror housing, not shown, covers the central function support 2 on the outside.

Figure 2:
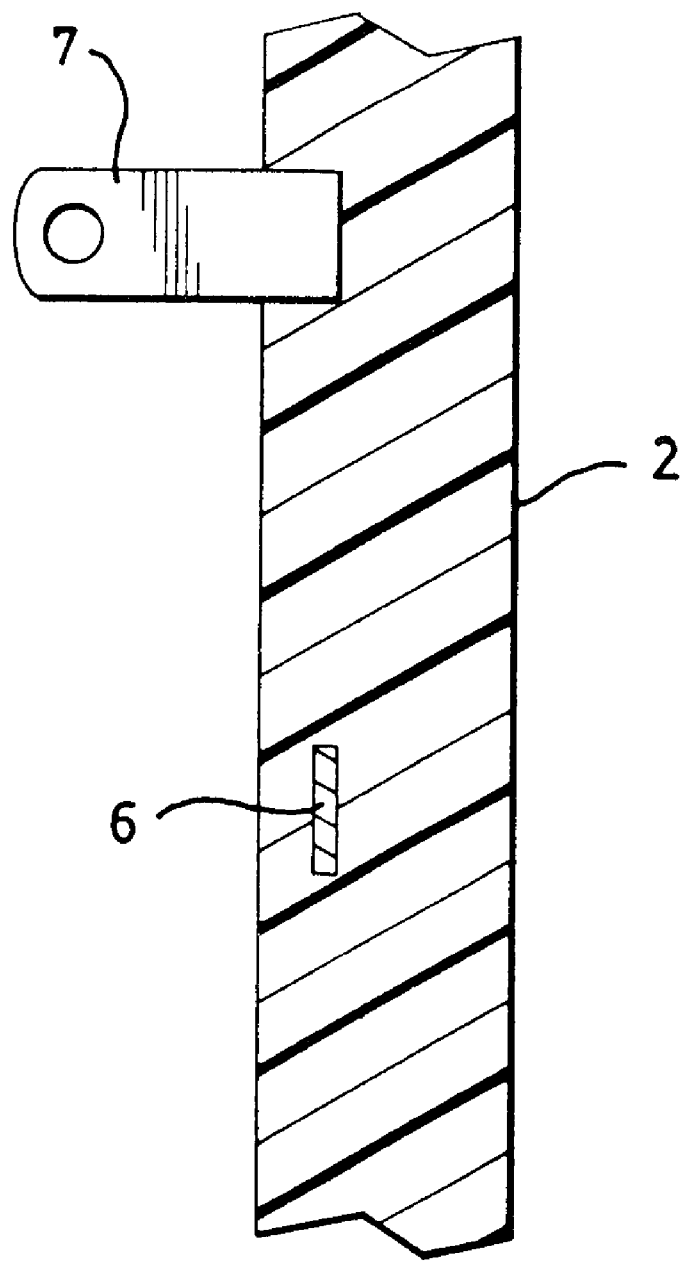
FIG. 2 is a cross sectional view taken through part of the support element according to FIG. 1.

FIG. 2 shows a cross section through part of the central function support 2. It can be seen that the conductor paths 6 are completely embedded in the plastics material of the central function support 2. Only the ends of the conductor paths 6 constructed as plug tongues 7 project from the plastics material of the central function support 2, so that they can be electrically connected.

Figure 3:
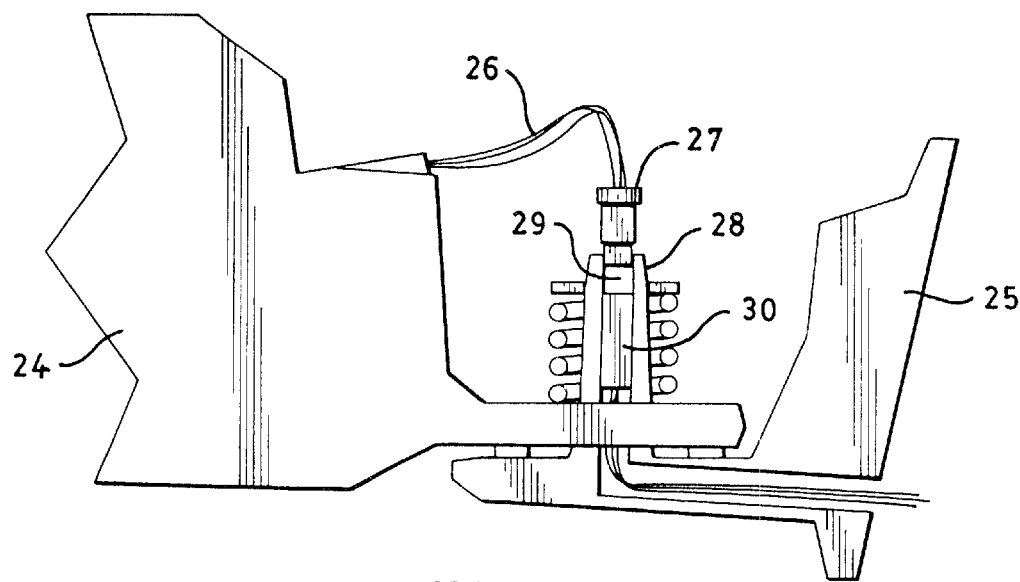
FIG. 3 is a longitudinal sectional view taken through a first embodiment of a connection between a support element and a mirror base.

FIG. 3 shows a support element according to the invention constructed as a central function support 24, which is rotatably mounted on a mirror base 25. The conductor paths on the support element extend within the central function support and are therefore not visible in FIG. 3. Connected to the ends of the individual conductor paths are flexible current cables 26, whose first end is connected to the conductor paths and is enclosed by the material of the central function support 24, and whose second end is connected in each case with a contact element of a multipolar plug connector 27. The socket 30 having a complementary function to the plug connector 27 is arranged in the recess 29 formed by the connecting element 28, so that following the securing of the central function support 24 to the connecting element 28 of the mirror base 25, it is merely necessary to push the plug connector 27 into the socket 30 in order to produce the electrical connection of the various function elements in the external rear view mirror to the mains power supply.

Figure 4:
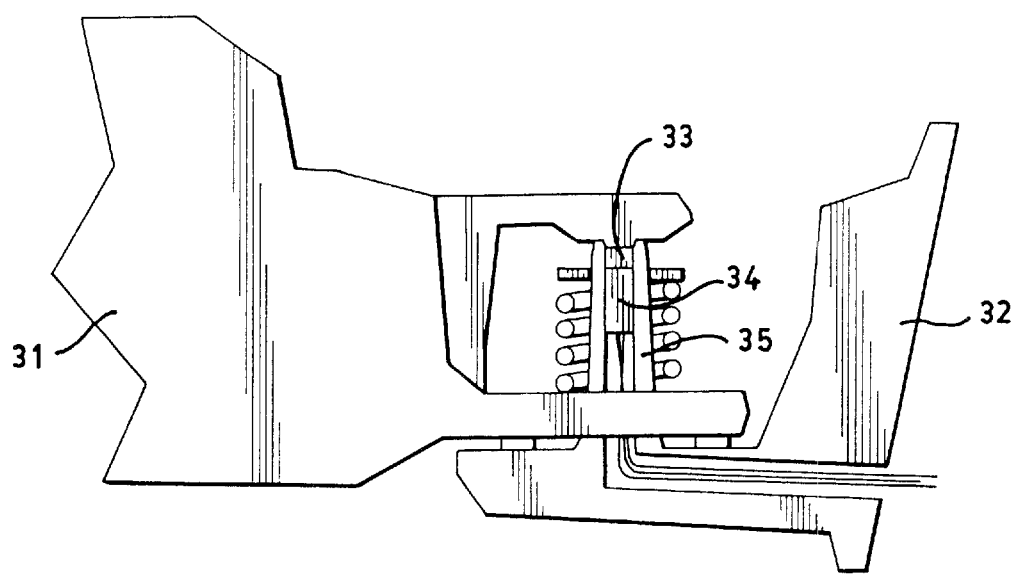
FIG. 4 is a longitudinal sectional view taken through a second embodiment of a connection between a support element and a mirror base.

FIG. 4 shows a support element 31 and a mirror base 32, the conductor paths in the support element 31 again not being shown. The multi-polar plug connector 33 on the support element 31 is constructed in such a manner that, during the linear downwardly directed joining movement in order to secure the support element 31 to the mirror base 32, the multipolar plug connector 33 comes to rest in the matching socket 34 in the connecting element 35. The socket 34 is in turn connected via the lines 36 to the mains (system) power supply of the motor vehicle.

While specific embodiments of the invention have been shown and described in detail to illustrate the application of the principles of the invention, it will be understood that the invention may be embodied otherwise without departing from such principles.

What is claimed is:

1. A motor vehicle external rear view mirror assembly comprising:
    a glass assembly;
    at least one electrical function element;
    a support element, to which the electrical function element can be secured, the support element including an electrical conductor path with a first end to which an electrical function element can be connected and having a second end which is connectable to a conductor that makes electrical connection to at least one electrical function elsewhere in the motor vehicle;
said support element being at least partially formed of a non-conducting moldable material and wherein said electrical conductor path comprises an electrical conductor embedded at least in certain areas in said non-conducting material of said support element and wherein at least one of said first end and said second end of said conductor path comprises at least one of a plug and a socket.

2. A rear view mirror assembly according to claim 1, wherein said first end and said second end of said conductor path are constructed as a plug contact, more particularly as a plug tongue.

3. A rear view mirror assembly according to claim 1, wherein said electrical conductor comprises a metal wire.

4. A rear view mirror assembly according to claim 1, wherein said support element includes an injection molded part, the conductor paths being laid into the mold pockets, prior to the injection of plastics material.

5. A rear view mirror assembly according to claim 1, wherein said conductor path is formed of a wire material which is substantially resistant to bending.

6. A rear view mirror assembly according to claim 5, wherein said conductor path comprises a profiled conductor cross section.

7. A rear view mirror assembly according to claim 1, wherein said conductor path is formed of a substantially flexible cable material.

8. A rear view mirror assembly according to claim 7, wherein said electrical function element comprises at least one contact element having a complementary function to the first end of said conductor path, said contact element being arranged in such a manner that, when the electrical function element is secured in a correct position relative to the support element, said contact element can be brought into electrically conductive contact with the end of said conductor path.

9. A rear view mirror assembly according to claim 1, wherein a plurality of conductor paths are provided each with second ends arranged on said support element in such a manner that a contact elements of a multi-polar plug connector can be brought into contact in each case with a second end of a conductor path.

10. A rear view mirror assembly according to claim 1, further comprising a flexible current cable connected to at least one end of said conductor path, the contact point between the conductor path and the current cable being embedded in the material of said support element.

11. A rear view mirror assembly according to claim 10, further comprising a multi-polar plug connector, wherein a plurality of current cables are connected to the conductor paths to form a cable set, with an end having said multi-polar plug connector arranged for connecting the current cables to a system power supply connector to form a plug connection.

12. A rear view mirror assembly according to claim 11, further comprising a mirror base, wherein said plug connection is arranged in a recess in said mirror base.

13. A rear view mirror assembly according to claim 1, further comprising a mirror base, a support element connector connected to said conductor paths and a system power supply connector, said support element connector being brought into electrically conductive contact with said power supply connector when said support element is secured in a correct position with respect to said mirror base.

14. A rear view mirror assembly according to claim 13, wherein at least one conductor path has a branched construction, so that at least two function elements can be connected in common via said conductor path to said system power supply of the motor vehicle.

15. A rear view mirror assembly according to one of claim 1, wherein two branched conductor paths are provided, which connect at least two function elements in the rear view mirror with a multiplex signal control of the motor vehicle.

16. A rear view mirror assembly according to claim 1, wherein said support element is constructed as a central function support, which can be secured to a mirror base.

17. A rear view mirror assembly according to claim 1, wherein said support element is constructed as part of the mirror housing.

18. An external rear view mirror of a motor vehicle with a glass subassembly, at least one electrical functional element, more particularly at least one of an adjustment drive, an electro-optic element, a lighting device, a folding drive and a heating element, comprising:
    a support element, to which the electrical function element can be secured, said support element including at least one electrical conductor path with a first end to which the at least one electrical function element can be connected and to whose second end can be connected a conductor that makes electrical connection to at least one electrical function elsewhere in the motor vehicle; said support element being at least partially formed of a non-conducting moldable material and wherein said electrical conductor path comprises an electrical conductor embedded at least in certain areas in said non-conducting material of said support element and wherein at least one of said first end and said second end of said conductor path comprises at least one of a plug and a socket.

19. A motor vehicle external rear view mirror having a mirror element subassembly and at least one electrical functional element, the mirror comprising:
    a support element with an electrical conductor path having a first end for connection to the electrical function element and having a second end connected to a conductor that provides a motor vehicle system electrical connection; said support element being at least partially formed of a non-conducting moldable material and wherein said electrical conductor path comprises an electrical conductor embedded at least in certain areas in said non-conducting material of said support element and wherein at least one of said first end and said second end of said conductor path comprises at least one of a plug and a socket.

20. The rear view mirror according to claim 19, wherein at least one of said first end and said second end of said conductor path has a plug contact and said conductor path is embedded at least in certain areas in the material of said support element.

21. A rear view mirror assembly according to claim 1, wherein said first end of said conductor path is constructed as a plug contact, more particularly as a plug tongue.

22. A rear view mirror assembly according to claim 1, wherein said second end of said conductor path is constructed as a plug contact, more particularly as a plug tongue.

23. A rear view mirror assembly according to claim 5, wherein said conductor path comprises a hollow conductor cross section.

24. A rear view mirror assembly according to claim 1, wherein said support element is constructed as part of the body mirror.

* * * * *